US012769835B2

(12) United States Patent
Olson

(10) Patent No.: US 12,769,835 B2
(45) Date of Patent: Oct. 20, 2026

(54) SYSTEM FOR VERIFICATION OF INTEGRITY OF UNMANNED AERIAL VEHICLES

(71) Applicant: LTS Systems, LLC, New York, NY (US)

(72) Inventor: Erlend Olson, Newport Beach, CA (US)

(73) Assignee: LTS Systems, LLC, New York, NY (US)

( * ) Notice: Subject to any disclaimer, the term of this patent is extended or adjusted under 35 U.S.C. 154(b) by 0 days.

(21) Appl. No.: 16/093,897

(22) PCT Filed: Jun. 7, 2017

(86) PCT No.: PCT/US2017/036427
§ 371 (c)(1),
(2) Date: Oct. 15, 2018

(87) PCT Pub. No.: WO2017/181204
PCT Pub. Date: Oct. 19, 2017

(65) Prior Publication Data

US 2019/0087576 A1 Mar. 21, 2019

Related U.S. Application Data

(60) Provisional application No. 62/322,600, filed on Apr. 14, 2016.

(51) Int. Cl.
*G06F 21/57* (2013.01)
*B64U 10/14* (2023.01)
(Continued)

(52) U.S. Cl.
CPC ................ *G06F 21/57* (2013.01); *G06F 7/00* (2013.01); *G06F 16/9014* (2019.01);
(Continued)

(58) Field of Classification Search
CPC ........ G06F 21/57; G06F 16/9014; G06F 7/00; G06F 21/44; B64C 39/024; B64C 2201/146
See application file for complete search history.

(56) References Cited

U.S. PATENT DOCUMENTS

| | | | |
|---|---|---|---|
| 5,499,295 | A | 3/1996 | Cooper |
| 6,058,478 | A | 5/2000 | Davis |

(Continued)

OTHER PUBLICATIONS

"Airworthy" [online] Merriam-Webster via Archive.org, Apr. 1, 2016 [retrieved Jan. 24, 2023]. Retrieved from the Internet: URL: https://web.archive.org/web/20160401103522/www.merriam-webster.com/dictionary/airworthy (Year: 2016).*

(Continued)

*Primary Examiner* — Taghi T Arani
*Assistant Examiner* — Joshua Raymond White
(74) *Attorney, Agent, or Firm* — Bonini IP Law, LLC; Frank J. Bonini, Jr.

(57) ABSTRACT

A system for verifying the integrity of unmanned aerial vehicles (UAVs), which is configured to reside in a UAV and interface with both the communications system of the UAV and the UAV's software and hardware resources. The UAV may be configured to execute firmware that obtains a serial number or unique identifier of hardware and software on the UAV, creates a hash code combination of such unique identifiers, encrypts the hash code, transmits the encrypted hash code over a wired or wireless communications system to another computer which maintains a table of the certified codes of each UAV which results in the computer authenticating the specific UAV (or not). The system also may determine whether a specific UAV's hardware or software has been changed since the UAV was last certified.

40 Claims, 3 Drawing Sheets

(51) Int. Cl.
*B64U 10/25* (2023.01)
*G06F 7/00* (2006.01)
*G06F 16/901* (2019.01)
*G06F 21/44* (2013.01)

(52) U.S. Cl.
CPC .............. *G06F 21/44* (2013.01); *B64U 10/14* (2023.01); *B64U 10/25* (2023.01); *B64U 2201/20* (2023.01)

(56) References Cited

U.S. PATENT DOCUMENTS

| | | | | |
|---|---|---|---|---|
| 7,836,299 | B2 | 11/2010 | England et al. | |
| 7,908,483 | B2 | 3/2011 | Iliev et al. | |
| 7,930,733 | B1 * | 4/2011 | Iftode | G06F 21/575 713/168 |
| 8,327,153 | B2 | 12/2012 | Lee et al. | |
| 8,375,221 | B1 | 2/2013 | Thom et al. | |
| 8,838,289 | B2 | 9/2014 | Margolin | |
| 2003/0081785 | A1 * | 5/2003 | Boneh | H04L 9/0847 380/277 |
| 2009/0019285 | A1 * | 1/2009 | Chen | G06F 21/575 713/175 |
| 2010/0201543 | A1 * | 8/2010 | Shorey | G08G 1/161 340/902 |
| 2011/0138188 | A1 * | 6/2011 | Lee | G06F 21/57 713/187 |
| 2012/0266209 | A1 * | 10/2012 | Gooding | H04L 63/20 726/1 |
| 2013/0036103 | A1 * | 2/2013 | Lawson | G06F 21/64 707/698 |
| 2013/0198838 | A1 * | 8/2013 | Schmidt | H04L 63/126 726/22 |
| 2014/0233412 | A1 | 8/2014 | Mishra et al. | |
| 2014/0241239 | A1 | 8/2014 | Chang | |
| 2014/0379173 | A1 * | 12/2014 | Knapp | B64C 19/00 701/2 |
| 2015/0147976 | A1 | 5/2015 | Wang et al. | |
| 2015/0237502 | A1 * | 8/2015 | Schmidt | G06F 21/44 726/7 |
| 2015/0318998 | A1 * | 11/2015 | Erlikhman | H04L 63/0853 713/171 |
| 2015/0379306 | A1 * | 12/2015 | Zimmer | G09C 1/00 713/193 |
| 2016/0050011 | A1 | 2/2016 | Frolov et al. | |
| 2016/0068266 | A1 * | 3/2016 | Carroll | B64D 35/02 244/53 R |
| 2016/0098259 | A1 | 4/2016 | Mitchell | |
| 2016/0105233 | A1 | 4/2016 | Jalali | |
| 2016/0152337 | A1 * | 6/2016 | Downey | B64D 47/00 701/2 |
| 2016/0244187 | A1 | 8/2016 | Byers et al. | |
| 2016/0359866 | A1 * | 12/2016 | Mixer | H04L 63/0876 |
| 2017/0050748 | A1 * | 2/2017 | Byers | H04W 4/021 |
| 2017/0287341 | A1 * | 10/2017 | Jarrell | G08G 5/26 |

OTHER PUBLICATIONS

Boneh, Christopher “Attestation and Trusted Computing” [online] University of Washington, Mar. 2006 [retrieved Aug. 26, 2023]. Retrieved from the Internet: URL: https://courses.cs.washington.edu/courses/csep590/06wi/finalprojects/bare.pdf (Year: 2006).*

Bare, Christopher “Attestation and Trusted Computing” [online] University of Washington, Mar. 2006 [retrieved Aug. 26, 2023]. Retrieved from the Internet: URL: https://courses.cs.washington.edu/courses/csep590/06wi/finalprojects/bare.pdf (Year: 2006).*

Braszko, Alex “Fiber Optic Drones: Posing a Significant C-UAS Challenge” [online] US Army, Aug. 2025 [retrieved Sep. 22, 2025]. Retrieved from the Internet: URL: https://www.army.mil/article/287737/fiber_optic_drones_posing_a_significant_c_uas_challenge (Year: 2025).*

Bare, Christopher “Attestation and Trusted Computing” [online] University of Washington, Mar. 2006 [retrieved Aug. 26, 2023]. Retrieved from the Internet: URL: https://courses.cs.washington.edu/courses/csep590/06wi/finalprojects/bare.pdf (Year: 2016).*

John D. Oetting and Tao Jen, “The Mobile User Objective System”, Johns Hopkins APL Technical Digest, vol. 30, No. 2 (2011), pp. 103-112.

Trusted Platform Module (TPM) Summary, Trusted Computing Group, 2016.

* cited by examiner

SYSTEM FOR VERIFICATION OF INTEGRITY OF UNMANNED AERIAL VEHICLES

BACKGROUND OF THE INVENTION

1. Field of the Invention

The invention relates to unmanned aerial vehicles (UAVs), and more particularly to a system for verifying the integrity of a UAV and regulating UAV flight operation.

2. Brief Description of the Related Art

Unmanned aerial vehicles (UAVs) are expected to proliferate into society in the coming years, performing functions such as delivering packages, remote-sensing inspections and assisting with other activities in daily commercial, industrial and consumer life. Unlike manned aircraft, UAVs are expected to operate much closer to humans, animals, property, buildings and equipment. In addition, UAVs are anticipated to perform their functions in automated fashion and increasingly beyond line of sight of an operator or trusted responsible person.

Because UAVs are operating in airspace alongside other manned aircraft, often with passengers, and in and around other objects and humans, they can pose a threat to life and property if they are operated with uncertified or incompatible or untested software or hardware, and they can pose a further threat if the UAV is hacked or taken over by an unauthorized person with nefarious purposes. Manned aircraft can pose a similar threat, however manned aircraft and manned aircraft flights are under the control of a trusted person—the pilot. The trusted person performs the functions of insuring flight safety and that the aircraft is under his control and flown in a safe manner.

Typically, flight plans are required for aircraft that use national airspace. The management of air traffic is important for safety of those traveling and/or piloting crafts, as well as individuals, property and animals at locations on the ground over which the crafts fly. Since the early days of flight, the United States has provided a system that both collects and distributes flight information from and to pilots. A pilot typically is required to submit or file a flight plan providing the intended direction of the locations to be traveled. The flight plan usually is required to include aircraft identification, special equipment, departure and arrival points and the route of the flight. A service, often referred to as Flight Service, is offered to pilots and is provided by a commercial entity or government (or a commercial entity that may contract with a government). The Flight Service is designed to provide information to pilots when the flight plan is filed, as well as updated notifications of activities or events that may potentially affect the intended flight plan. Aircraft flights are managed to allow several aircraft to be closely located within the same general airspace, while sufficiently separated so as not to interfere with or pose a safety risk to each other.

With the increasing use of UAVs, both for commercial and recreational purposes, the airspace, once reserved solely for traditional airplanes, is now shared with a variety of UAVs. In addition to the activities and alerts that pilots already are required to be aware of, another variable, namely, the potential presence of UAVs must also be accounted for. The Flight Service that warns pilots of adverse conditions, such as, for example, a closed runway or threatening weather, may also gather and provide information about nearby aircrafts, as well as nearby UAVs. There have been increasing demands for UAV operators not only to register their crafts, but also, in a number of instances, to provide information about their intended UAV operation, such as, a flight plan. The goal is designed to reduce interference and allow UAVs to cooperate in the same airspace as other aircraft. The desire is to reduce or eliminate the potential for mid-air collisions between an UAV and other aircraft. For example, the system that aircraft pilots use to obtain information and alerts of their impending flight, which typically is known as The Flight Service, has been updated to include a category of alerts that pertain to UAVs (sometimes referred to as an unmanned aerial systems, or UASs). Aircraft pilots, therefore, may be provided with information that identifies the potential presence of a UAV in the vicinity of an aircraft based on the aircraft flight plan, and information provided by the UAV operator. For example, an operator of a UAV or drone, may register and provide details, such as, the operator name and contact information, UAV identification, day and time of flight, maximum altitude, and flight boundary location, e.g., a radius based on geolocation coordinates.

The importance of integrating UAV operation with traditional air space usage and aircraft is designed to provide the benefits of the UAV usage, as well as to promote safety by reducing the risks of adverse events, such as collisions.

However, as with any device, even abundances of precautionary measures may not eliminate all potential hazards. Given the precautions taken and the potential for risk, there is also the potential to cause damage to persons and property, including passengers of neighboring aircraft, as well as persons, animals, and structures on the ground. The potential exists for tampering with the UAV, including, for example, attempts to take over the UAV operation and divert it, or to operate it in a manner unintended by its original operator.

Since unmanned and beyond-line-of-sight UAVs may be operated in a fully autonomous mode with no direct human interaction, a system is needed to assure that the UAV's flight systems, software and hardware have not been tampered with, so that the UAV can be trusted to operate in airspace.

SUMMARY OF THE INVENTION

A system is provided for managing UAVs, and more particularly for regulating the operation of one or more UAVs by providing verification of the integrity of the UAV. According to preferred embodiments, the system provides verification of a UAV through a verification mechanism. According to preferred embodiments, the verification mechanism may be provided in conjunction with one or more UAV components (e.g., hardware), software, or combinations. A method for verifying a UAV and UAVs configured with a verification system, also are provided.

According to preferred embodiments, the system implements a security feature to ensure that the control of the UAV is as intended. A certification mechanism is implemented to provide a verification state for a UAV. The UAV verification state preferably is based on one or more modalities of the UAV hardware, software, or combinations of hardware and software. According to a preferred embodiment, a verification state may be implemented through a cryptographic system in which its cryptographic keys and/or cryptographic algorithms are employed to provide a state for the UAV. The UAV state preferably is assigned based on one or more unique properties that identify that particular UAV. Preferred embodiments may provide a cryptographic hash value for an essential hardware component (such as, for example, a drive or control motor serial number and/or model and/or install date), or essential software (such as, for example navigation software or both (a combination hash of a hardware component identification and software). The hardware component may be identified by its unique identification indicia, which, for example, may be the hardware serial number, model number, installation date, or some other identifier (or may preferably be identified by combinations of these), whereas the software may be identified by a unique property (a hash value, checksum hash, or the like).

According to preferred embodiments, the UAV may be authenticated and assigned a certification state. The UAV therefore may receive a certification, whereby the authentication state or authentication hash value is generated, and preferably stored for that specific UAV.

According to some preferred embodiments, the certification of the UAV may be one even without those that own or operate the UAV having knowledge of the verification policies, for example, where the policies are not revealed other than potentially to the verifying hardware such as a computer that is assigned to identify the UAV and certify it) or the organization having knowledge of what properties or characteristics are being verified. For example, the UAV may be provided with a certification instruction or chip that provides the verification. The verification may therefore be transmitted or obtained for storage from the UAV, and stored for reference and further use by a certifying authority.

According to some embodiments, the verification takes place using one or more electronic components, or software, of the UAV, or combinations thereof, which are designed to provide the UAV state, and identify deviations thereof. For example, where specific hardware or software is utilized in conjunction with the verification hash derivation, the identity of deviations of those specific pieces of hardware or software, or both, may be obtained upon conducting the verification.

The certification may be carried out by a certification authority. The certification authority may establish its own set of parameters for implementing certification of the UAV. According to some preferred embodiments, the certification authority may be provided with the ability to control UAV permissions and authorizations by certifying UAVs and verifying a UAV prior to the UAV undertaking some activity or operation. The certification authority may engage in secure communications with UAVs, which may be encrypted transmissions, or transmissions of encrypted verification data, or other cryptographic transmissions. According to some embodiments, the system may include one or more certification management operations features that may be implemented with hardware, such as a computer, and communications hardware, to conduct certifications of UAVs, and implement verification of UAVs prior to or even during flight.

The system may be configured to reside in a UAV and interface with both the communications system of the UAV and the UAV's software and hardware resources. The UAV may be configured to execute firmware that obtains a serial number or unique identifier of hardware and software on the UAV, creates a hash code combination of such unique identifiers, encrypts the hash code, transmits the encrypted hash code over a wired or wireless communications system to another computer which maintains a table of the certified codes of each UAV which results in the computer authenticating the specific UAV (or not). The system also may determine whether a specific UAV's hardware or software has been changed since the UAV was last certified.

The features described herein in connection with one embodiment may be used in other embodiments, and features may be combined together so that embodiments may be provided with one, two or combinations of several features.

BRIEF DESCRIPTION OF THE DRAWING FIGURES

DETAILED DESCRIPTION OF THE INVENTION

Figure 1:
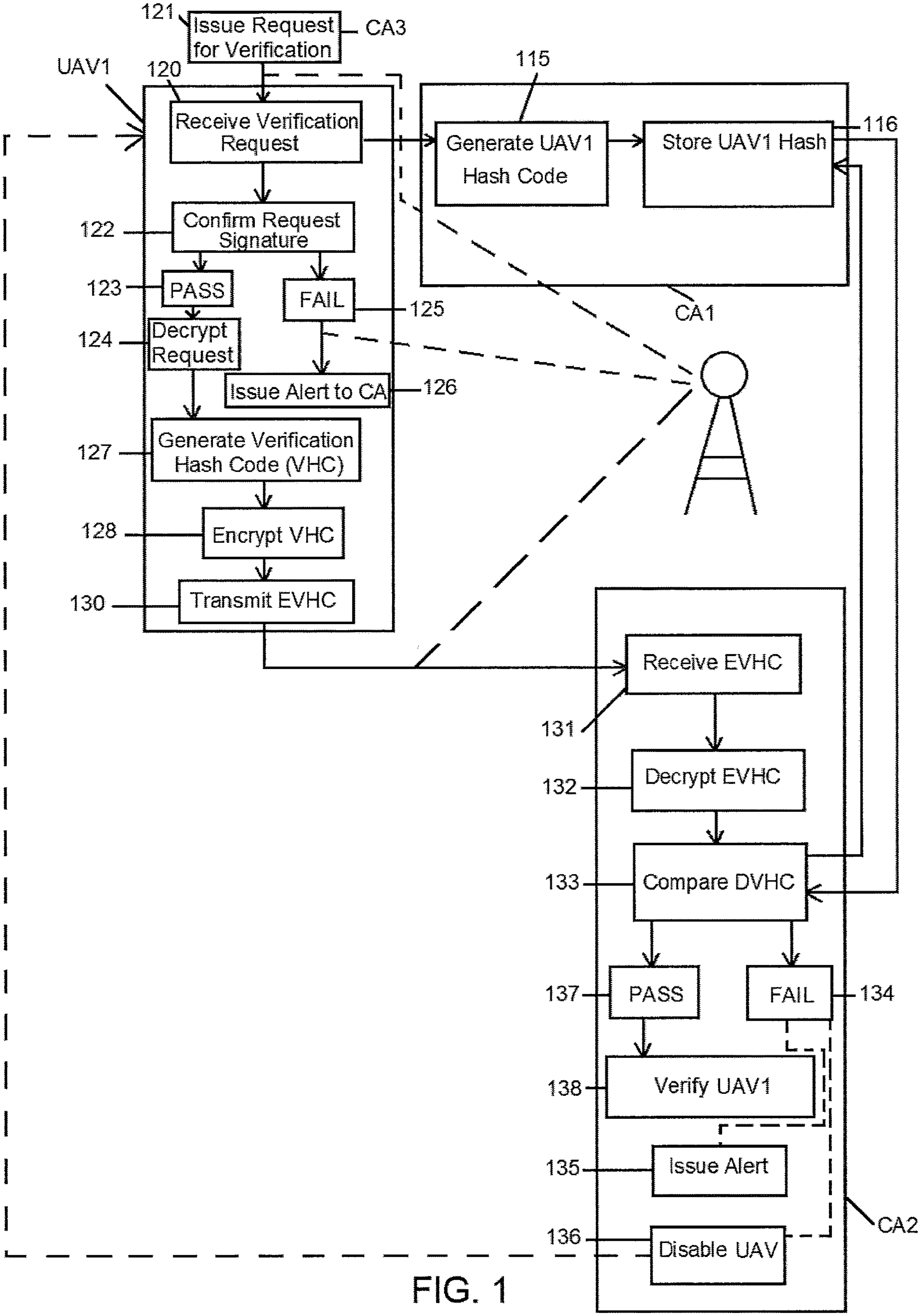
FIG. 1 is a flow diagram depicting an exemplary implementation of the system and showing process steps according to an implementation of a method for authenticating a UAV.

The system may be implemented by providing the UAV with a chip or software that includes instructions to generate the verification hash and provide the hash code.

For example, according to some embodiments, the present invention may provide a cryptographic system as part of the UAV device circuitry, which may comprise a storage component, microcircuit, microcontroller or processor, along with instructions for generating and/or storing a key. For example, according to one embodiment, an integrated circuit component is provided including a storage element for internally storing a public key of the certifying organization for use in encrypting a unique verification state code generated from the UAV (e.g., components, software or combinations thereof), and/or decrypting a digital signature from the certifying entity. This public key and/or private key may be implemented as a further way to provide security by encrypting the unique hash code (such as, for example, a verification code requested of the UAV by the certifying organization computer). The public or private key implementation embodiments may further include a time element or location element to further encrypt the hash code.

According to embodiments, the system provides verification of the UAV to verify that the UAV hardware and/or software has not been changed. Where the system identifies a change to hardware or software, according to some preferred embodiments, the system may be configured to identify the component or components (hardware item or software) that have been changed. In addition, the certifying organization may implement protocols for recertification, such as, for example, where a motor has been replaced, or where an upgrade, e.g., to a navigational component or navigation software, has been made. The recertification may be done so that any changes made are approved, authorized, and/or meet any regulatory requirements, and are acknowledged by the authentication or certification hash value.

According to some preferred embodiments, the system may be implemented to secure the operation of an unmanned aerial vehicle (UAV). The UAV preferably includes a plurality of hardware components and software. An authentication hash code corresponding to the UAV is generated. This is done preferably by obtaining a unique identifier from at least one of the UAV hardware components or the UAV software, and, according to preferred embodiments, from both unique identifier, such as, a serial number or checksum, of the respective hardware and software. An authentication hash code is created for the hardware or software, or combination of the hardware and software identifiers. The system preferably is employed in conjunction with a remote computing component that is remotely situated from the UAV and is configured to exchange communications with the UAV over a network. The UAV preferably includes a computing component, which may be provided separately or as part of the UAV circuitry. An authentication hash code of the UAV preferably is stored (e.g., upon the UAV being certified) and is available to the remote computing component, via an accessible database, table or other access means. In order to verify the UAV the remote computing component receives an encrypted verification code from the UAV, and then decrypts the verification code and compares it with the authentication code for that UAV. If there is a match, then the UAV is authenticated, but if there is no match, then the UAV is not authenticated.

According to some embodiments, the UAV may make a request to a certifying organization by contacting a certifying computer through a network. According to some embodiments, the certifying organization or computer (e.g., a remote computing component) may make a request of a UAV for the UAV to provide verification information. The UAV may receive the request and may generate the verification code, such as a hash value. According to some embodiments, the UAV is configured with instructions that provide the protocol for generating the verification hash value from the UAV components. The instructions and protocol, according to some embodiments, may be implemented via a TPM chip or system, or f MM. According to embodiments of the system, the UAV may be configured with a protocol that is a zero-knowledge proof protocol, where verification of the UAV authentication parameters may remain unknown to the UAV (even though the UAV carries the hardware and software component information from which the verification hash is generated). For example, according to some embodiments, the UAV also may be configured to generate a verification hash without specifically being provided with the knowledge. According to some other embodiments, the exchanges of communications between the UAV and the certifying authority computer may be secured with keys, as well as through implementation of a zero-knowledge proof protocol.

Once the verification code is generated based on the existing UAV hardware and software information, the verification code is then communicated to the certification computer, which, according to some embodiments, is remote from the UAV. The verification code preferably is encrypted when transmitted, and is decrypted by the certification computer. According to some embodiments, the UAV may connect to the certification computer through a wired connection, and according to other embodiments may be connected through a wireless connection.

The verification of the UAV, for example, may provide an indication of whether any software changes have taken place (including whether any unauthorized software changes occurred), whether any hardware changes have been made, or both.

According to preferred embodiments, a database is provided having a stored plurality of authentication hash codes that correspond with a respective plurality of UAVs, whereby each specific UAV may be authenticated by its respective authentication hash code. For example a remotely situated computing component may maintain or access a table of the certified codes of a plurality of UAVs. The certified codes e.g., authentication hash codes) may be stored in encrypted form.

The present invention may also provide a cryptographic device as an integrated circuit component resident on the UAV, which may include a storing element for internally storing a public key of the regulatory entity (such as the certifying organization) for use in decrypting a digital signature from the regulatory entity, thus verifying that any directive received by the UAV (e.g., to generate and/or provide a verification code) is authorized by the regulatory entity.

The present invention may further provide the cryptographic device as an integrated circuit component with the capability of internally generating a unique public/private key pair for potential use in performing encryption/decryption operations, securely containing and using the public/private key pair within the cryptographic device to substantially prevent detection of the key pair through reverse engineering, as well as providing a modifiable cryptographic device as a unique integrated circuit component which can remotely perform guaranteed authorized modifications.

According to an exemplary embodiment, in accordance with a preferred implementation of the system, each UAV that is to be authorized to fly in certain airspaces, based on regulations or other legal restrictions, first obtains a certification. The certification preferably is carried out by a certification or regulatory authority. The certification preferably comprises a certification of the UAV hardware and/or software, and, according to preferred embodiments, preferably comprises a certification of the UAV's major flight and navigation systems (which preferably may include hardware components and software). According to preferred implementations, the certification is carried out by a testing or certification authority that may provide subsequent verification of the UAV.

Preferably, the UAV may be inspected or otherwise determined to have acceptable hardware, software, and preferably both. For example, within the certified UAV, specific software and hardware that has been authorized as air worthy for that specific UAV is then connected to either a hardware or software or combination hardware/software system which computes a hash code representing the state of the hardware and software on some pre-determined part of the UAV's command and control and navigation systems. According to some preferred embodiments, the hash code may be created from a combination of the electronically read-able serial number and model number and date of installation of hardware (such as, for example, a computer or a drive motor) and the checksum or hash code of each piece of important software in the UAV's computing systems. The number of hardware and software elements may be determined by regulations or best practices, without limitation. A hash is created at the time of certification, which is the certification or authentication hash. The certification or authentication hash preferably is then stored in a secure location associated with a computer that verifies the hash codes for UAVs at the time when they wish to use national air space for flight operations (or other regulated operation).

Examples of authentication hash codes that may be implemented for certification of the UAV are depicted in exemplary tables set forth below. The tables illustrate hardware component identification and an authentication hash value associated with each of the respective exemplary hardware components listed (although there may be additional hardware components of the UAV other than those listed here, and which also may be used for determining the authentication value). A table provided for software of the UAV is shown and lists some examples of essential operations software. An example of a combination of hardware and software is depicted in a table illustrating a hash value for the combination of the hardware and software. In the depiction, the hash values are generated from the hardware indicia (e.g., serial number, model number and installation date) and software indicia combined. In addition, according to some other embodiments, the values may be combined together (hardware value string|software value string) and a hash value computed. According to other embodiments, the values may be certified for each hardware component and for each software so that in the event that the verification of the UAV fails, the individual component hardware or software may be identified as causing the failure fault. Tables providing exemplary illustration of the certification or authentication values are as follows:

Hardware Table

| Hardware | Serial No. | Model No. | Installation Date | Authentication Hash Value |
|---|---|---|---|---|
| Rotor Drive Motor 1 | 17507676376 | 235489 | Apr. 4, 2014 | 4673681254 |
| Rotor Drive Motor 2 | 16408706385 | 571863 | May 7, 2014 | 3435799895 |
| Rotor Drive Motor 3 | 12156871587 | 978153 | Jun. 8, 2014 | 2565871215 |
| Rotor Drive Motor 4 | 18542685854 | 468512 | Jul. 11, 2014 | 5452875728 |
| Rotor Orienting Motor 1 | 29485672546 | 325418 | Aug. 14, 2014 | 8613481576 |
| Rotor Orienting Motor 2 | 26715672482 | 976247 | Sep. 17, 2014 | 7512345637 |
| Rotor Orienting Motor 3 | 23587459854 | 489415 | Oct. 24, 2014 | 9235934782 |
| Rotor Orienting Motor 4 | 24545875846 | 365272 | Nov. 27, 2014 | 6546173591 |

Software Table

| Software | Check Sum/Hash |
|---|---|
| Navigation Software | 1652773410 |
| Motor Drive Software | 1784428372 |
| Communication Software | 1374215734 |

Combination Hardware/Software

| Hardware/Software | Serial No. | Model No. | Installation Date | Check Sum/Hash | Authentication Hash Value |
|---|---|---|---|---|---|
| Rotor Motor 1 + Navigation Software | 17507676376 | 235489 | Apr. 4, 2014 | 1652773410 | 8654025907 |
| Rotor Motor 2 + Motor Drive Software | 16408706385 | 571863 | May 7, 2014 | 1784428372 | 8987456516 |

Referring to FIG. 1, a diagram depicting an exemplary embodiment of the implementation of the system in connection with an unmanned aerial vehicle, which in this illustration is UAV1. The vehicle, UAV1, preferably undergoes a certification procedure, which in the illustration is carried out by a certification authority computer, CAL A certification hash code (or authentication hash code) is generated, block 115, and stored, block 116 for subsequent reference, when the UAV1 is being verified by the certification authority, such as the command control computer (CA, e.g., CA1, CA2, CA3). The vehicle UAV1 receives a request, block 120, from a requesting component, block 121, which may be a computer configured as a command control authority that certifies the UAVs. In the illustration of FIG. 1, the reference to CA1, CA2, CA3, may be a single computer of a certification authority, or may be one or more separate computers. Alternatively, the request received by UAV1, block 120, may be generated from a rogue component, such as a nefarious computer, hacker computer, or other malicious transmission. The request, block 121, preferably is transmitted with a certificate or signature, and is cryptographically provided. The UAV1 receives the request, block 120, and determines whether the request meets the requirements for the authorized signature, certificate or other security feature, block 122. If the request is deemed to be from the trusted certifying authority (CA1), then the UAV1 passes the request, block 123, and implements processing of the request by decrypting the request, block 124. Where the request cannot be deemed to be trusted, and hence, fails, block 125, no further processing of the request may be undertaken, or, alternatively, or in addition, an alert may be generated and communicated, such as, for example, to a certification computing component, block 126. Where the request has passed, block 123, UAV1 decrypts the request, block 124, and generates a verification hash code (VHC), block 127. The VHC is then encrypted, block 128, and the encrypted verification hash code (EVHC) is transmitted, block 130, to the certification computer, shown as CA2 in FIG. 1.

The certification computer CA2 receives the EVHC, block 131, from the UAV1, decrypts the EVHC, block 132, and compares the decrypted verification hash code (DVHC), block 133 with the stored UAV1 hash code, block 116. Where the comparison fails, block 134, then an alert may be issued, block 135, to a component, or a human, through a device, such as, a computer, tablet, or other notification device. Alternatively, the failure to verify the UAV1 may prevent the authorization for the UAV1 to proceed further or carry out particular operations. The UAV1 may be unauthorized to enter the protected airspace or zone. According to some embodiments, the certification computer, CA2, in this example, may issue a command to disable the UAV1 or one or more functions of the UAV1, block 136.

Where the comparison of the DVHC, block 133, matches the stored UAV1 hash value, block 116, the verification of the UAV1 passes, block 137, and the UAV1 is verified, block 138. According to some alternate embodiments, the UAV1 makes a request of a remote computer, such as, the certification authority computer (e.g., CA1,CA2,CA3) to verify UAV1. This may be done when the UAV1 desires to undertake some action, such as, for example, enter a designated or controlled airspace, operate a camera, or deliver a payload.

The UAV may initiate a request to a certification authority be verified. This request may be issued from the UAV to a certification authority computer. The certification authority computer may receive and process the request and undertake verification of the UAV. For example, the UAV may make a request for verification in order to enter a controlled airspace, undertake a particular flight plan or path, carry out an operation, such as, imaging, deployment of a payload, or other function. In accordance with this implementation, FIG.

Figure 2:
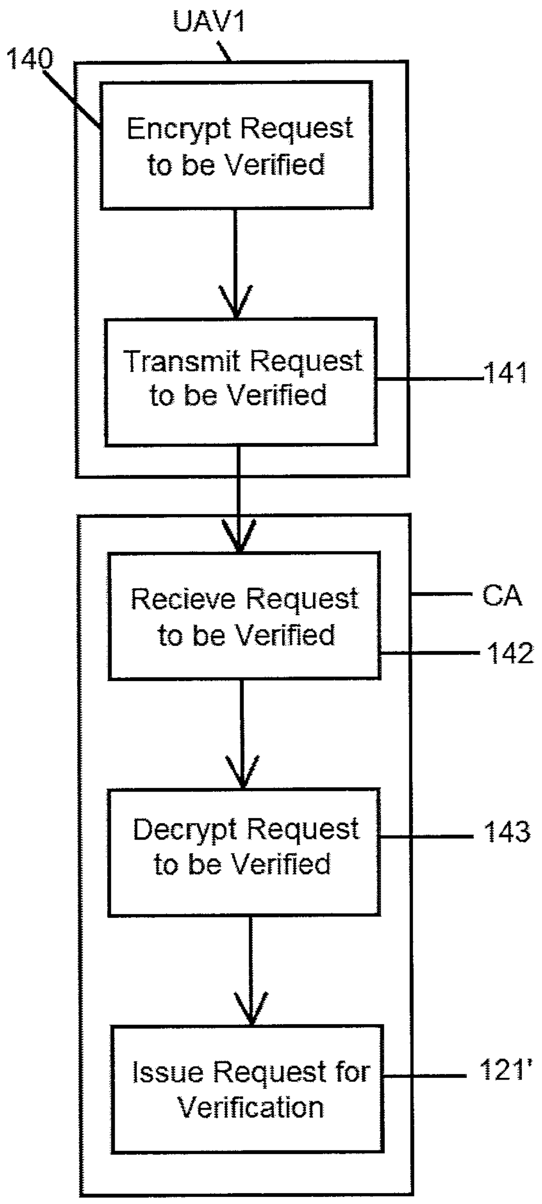
FIG. 2 is a flow diagram depicting another implementation of the system illustrating a UAV requesting to be verified.

2 depicts an example of a diagram illustrating a UAV, UAV1, making a request of the certification authority CA. The depiction in FIG. 2 may take place in addition to, or as an alternative to the certification computer CA1 of FIG. 1 issuing a request for verification (see block 121 of FIG. 1). As illustrated in FIG. 2, UAV1 makes a request, preferably, by encrypting the request, block 140, and then transmitting the request, block 141, to a certification authority computer (e.g., such as the computer or computers, CA1,CA2,CA3 and CA depicted in FIGS. 1 and 2). The certification authority computer, CA depicted in FIG. 2 (which may be any one or more of the certification authority computers represented by CA1,CA2,CA3 of FIG. 1) receives the request to be verified from UAV1, block 142. The request (see, e.g., blocks 141 and 142) may be transmitted and received over a network (wired or wireless). The certification authority computer decrypts the request, block 143. Once the request is decrypted and deemed a trusted request from a UAV1, the verification of the UAV1, as requested, takes place. The verification may be carried out as illustrated herein, including, as depicted in the representative example of FIG. 1. The certification authority computer issues a request for the UAV1 to generate the verification hash value. This is represented by block 121' of FIG. 2, which essentially may proceed as depicted in FIG. 1, block 121.

According to embodiments of the invention, a UAV traffic management (UTM) system is provided to facilitate the management of the UAVs that may operate within a particular airspace. The UTM system preferably may regulate the airspace by verifying each UAV that is within the airspace or desires to enter the space.

At subsequent times, the UAV may generate and transmit a request so that it may be verified. Alternatively, the request may be generated autonomously in connection with the UAV undertaking of a particular activity, direction, flight plan or procedure. For example, where the UAV flight plan involves passage through a zone of airspace which is under regulation, the UAV may obtain verification. Once having been certified, the certified UAV may proceed to operate in conjunction with the certification system and management features. For example, the system may be configured so that when the UAV makes a request to the UAV traffic management (UTM) system, such as to file a flight plan, or be permitted to fly within controlled airspace, the UTM system uses any number of available encryption communications methods to query the UAV for its specific hash code, which is generated at the time of inquiry via co-encryption with a key or time code supplied by the UTM system, which requires that the UAV system actually create a new hash code rather than simply regurgitating a separately stored hash code which may not be reflective of the actual hardware and software on the UAV at the time of the request.

The verification hash code is then transmitted to the UTM computer verification system, which then decrypts the message received from the UAV in response to the query and determines whether it matches the same hash code stored after certification (i.e., the certification or authentication hash). If it matches, the UAV is presumed to be verified as authenticated, and if not, it is presumed not verified as authenticated, and then appropriate actions can be taken from there, depending on the nature of the UTM system, the nature of the UAV, regulations and other factors. For example, according to some embodiments, the UAV, upon failing to pass verification, may be disabled, may be issued an instruction to land at a particular location, may revert to manual control (or where the UTM system may itself, or in conjunction with another system, control the UAV flight operations). In addition, or alternatively, when the UAV fails verification, the system also may issue an alert to an appropriate individual, system or other component. Alternatively, failure of verification may render some, but not all, features of the UAV inoperative (e.g., the ability to release cargo or a payload).

The hash code on the UAV may be generated with hardware or software or combinations thereof on the UAV. The hash code on the UAV can be created by either hardware, such as a dedicated TPM chip, software such as that similar to or comprising fTPM, or some combination thereof.

According to preferred embodiments, the hash code may be generated based on one or more policies that correspond with the state of the UAV hardware, UAV software, both, or combinations thereof. The system may be configured to implement verification based on the specific component or components of the UAV, or the UAV software, such as, for example, a hash value, checksum, or both.

According to some preferred embodiments, the UAV may be configured with a dedicated Trusted Platform Module (TPM) chip or software such as that similar to or comprising fTPM, or one or more combinations of these features. For example, a conventional TPM, such as a hardware device or "chip" may be provided, and, according to some embodiments, may include its own secure crypto-processor. A TPM chip or software may be provided as part of or in conjunction with the circuitry of the UAV. The TPM chip or software may securely generate cryptographic keys, as well as limitations on their use. The TPM chip also may include a feature of a hardware pseudo-random number generator. The system preferably is configured to generate a hash value based on particular hardware and/or software configurations of the UAV, and thereby provide remote attestation of the UAV in connection with the certification. For example, in the event that unauthorized changes are made to the UAV software, e.g., to take over operations or to remove certain functionalities, the hash value, such as the TPM provided hash value, may identify and detect the change to the UAV. Preferred implementations may provide a certification organization (such as the regulatory authority) with the ability to identify unauthorized changes (e.g., to software or UAV hardware components), including where potential tampering with the UAV software has occurred (e.g., where an undesirable or even unlawful purpose is to be carried out). According to preferred embodiments, the hash value preferably is obtained by generating a certificate that identifies the software that is currently running, the hardware profile of one or more hardware components of the UAV, or combinations of these. For example, the serial number of a hardware component, such as a drive motor, its model number and date of install, as well as an identification or serial number of a navigation chip may be used to generate a certification or authentication hash for the UAV. The certification system may be used by having the certification organization identify the hash value and compare the value to the expected known acceptable or trusted value. According to some embodiments, the certification organization may generate the certification hash (or authentication hash) that is associated with the UAV and store it for reference for future verification. The trusted value, for example, may be a hash value that indicates proper installation, operation, and/or other property of the UAV software and hardware. The UAV preferably is configured with instructions, which, for example, may be provided in a TPM component (such as a chip) or fTPM component or chip, which utilize the parameters of the existing hardware and software components, preferably, at the time of a request for authentication, to produce a hash value which is transmitted to the certifying authority in order to verify the UAV.

According to preferred embodiments, the system preferably is configured to function with a variety of UAVs, and, according to preferred embodiments, specially configured UAVs may be provided for use in connection with the certification system. For example, preferably, a UAV is configured so that the certifying organization may remotely communicate with the UAV, and exchange communications which preferably includes a certificate or hash verification. The communications preferably are secure communications, and preferably are encrypted. A remotely situated computing component preferably is configured to communicate with the UAV. According to a preferred implementation of the system, the computing component is configured with software containing instructions for ascertaining an authentication state of the UAV and verifying the UAV. According to some implementations, the computing component may receive requests from the UAV for certification. According to some implementations, the computing component also may issue requests to a UAV and undertake to certify the UAV, even where the UAV has not so requested. The verification preferably may be provided as an operational requirement. For example, according to some implementations, the UAV may be required to pass verification in order to carry out one or more functions, such as, for example, being able to fly, or to be admitted into the controlled airspace, or being able to carry out one or more operational functions (e.g., deliver a payload, operate a camera, transmit video, and the like).

The present system preferably may be configured to further safeguard the communications between the UAV and remote component, such as the certification organization by implementing encryption of the information exchanged between the UAV and a remote computing component. For example, the remote attestation preferably may be combined with public-key encryption in order to prevent potential utilization of the information in the event that the communication is intercepted (e.g., such as by an eavesdropper).

According to some alternate embodiments, the system may implement a direct anonymous attestation (DAA) security. A DAA signing system may be implemented in connection with the TPM chip or system to provide for secure exchanges between the UAV and the certifying authority.

According to some preferred embodiments, the certification organization may control the TPM chip or fTPM software. For example, the TPM chip's unique and secret RSA key may provide another level of authentication, by verifying that the regulatory computer seeking to query the UAV (e.g., for a computed hash value) is the genuine certification organization expected to be requesting the information.

According to some embodiments, the UAV circuitry may be configured with a discrete hardware TPM chip integrated into the circuitry or a system board of the UAV hardware components, such as, for example, the UAV computing components or system. For example, in accordance with some embodiments, the UAV may be configured with a suitable interconnection or other suitable hardware component that is capable of supporting the TPM.

The present system preferably provides safeguards to minimize or eliminate potential intrusions to the hardware and software operating systems of a UAV. The system is designed to provide suitable integrity protections and provide defenses against potential malicious modifications to the UAV hardware and software.

According to some preferred embodiments, a "Firmware-Based TPM" or "fTPM," may be implemented in conjunction with the system to provide certification and verifications of the UAV. The "firmware TPM" or fTPM preferably may be implemented to provide a software interface to the security extension functionality integral to processors as an alternative to requiring a hardware TPM module. The fTPM may be utilized to provide trusting computing in conjunction with the certification system. For example, the fTPM may be implemented in the UAV, such as, for example, in the UAV circuitry, to provide a trusted execution environment. According to some preferred implementations, a UAV may be modified using fTPM software and provided with instructions to generate a certification or authentication hash in conjunction with the certification system.

According to some embodiments, a separately provided processor may be used by the UAV to run the certification operations, or alternatively, placing the software in protective memory of the UAV (such as storage that is not readable or modifiable by untrusted components).

Figure 3:
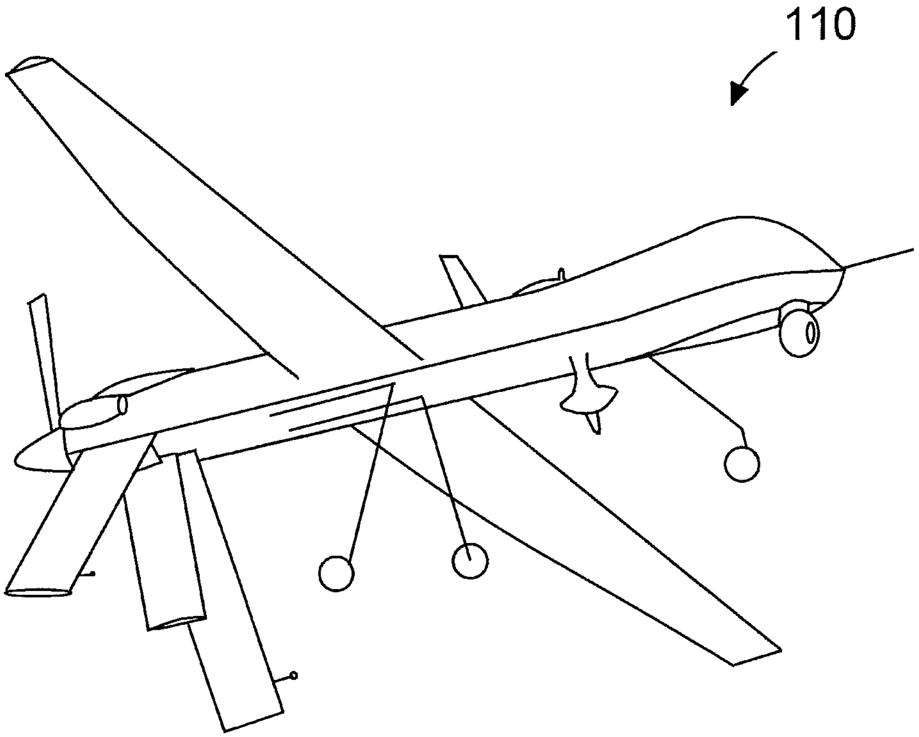
FIG. 3 is a perspective view of an exemplary embodiment of an unmanned aerial vehicle (UAV) implementing the system of the invention.
Figure 4:
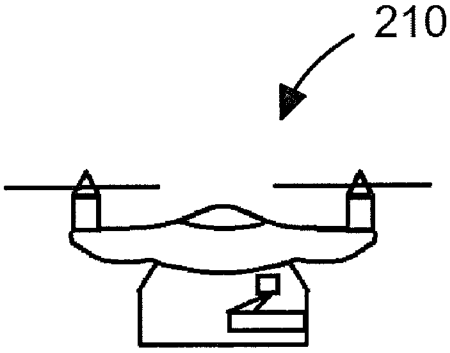
FIG. 4 is a front elevation view of another exemplary embodiment of an unmanned aerial vehicle (UAV) implementing the system of the invention.

Referring to FIGS. 3 and 4, examples of UAVs 110,210 that may be operated in accordance with the system are depicted. The UAV 110 is configured as a drone, and the UAV 210 is configured as a quadcopter. The UAVs 110,210 preferably are configured with a power supply and communications hardware. The UAVs 110,210 preferably include a computer which includes one or more processors, which, according to some embodiments, may comprise a microcircuit, microcontroller or microprocessor. The UAV or its computer preferably also includes a storage component (which may be part of the circuitry or a processing component, or separately provided). Preferably, software is provided on the UAV circuitry or computing components that contains instructions for monitoring the inputs, such as control signals, as well as flight properties (e.g., acceleration, direction, pitch, and yaw). The software also may include instructions for controlling the rotor operations, and may include a stabilization algorithm to produce stabilization for the intended flight (for smoothing the operation control and flight properties of the vehicle as instructions are carried out and the vehicle implements instructions from a control, program, or other source). The UAVs also may be configured with navigation components or circuitry, which, for example, may include a GPS and compass, which may be provided alone or together on a chip or circuitry, and in some instances with one or more other components (e.g., an IMU). The UAV may be configured with an electronic speed control that may be embodied in the software, hardware, vehicle circuitry, or combinations thereof. The speed control mechanism preferably may be provided to manage the operation of the motors that drive the rotors as well as changes to the rotor orientation (e.g., by changing the motor shaft direction), and may function by receiving remote signals, or operate in conjunction with programming directing flight path, direction and other vehicle operations. According to some embodiments, the certification organization, such as the remote computer that functions as a command and control computer to verify the UAV, may be provided with a capability to control one or more operations or functions of the UAV. According to some embodiments, the UAVs 110,210 preferably include a TPM chip or system, or may include fTPM firmware for managing the verification operations of the UAV.

Although exemplary embodiments of UAVs are depicted, the system may be employed in conjunction with other unmanned aerial vehicles. One or more of the features discussed in connection with one or more embodiments may be separately provided or combined together in other embodiments with one or more other features of the vehicles and/or system. In addition, the system is illustrated in conjunction with the vehicles 110,210, but alternately, the system may be deployed on an existing UAV, and may be provided as a module that is integrated or may be electronically coupled with the UAV computing and electronic components to provide for certification and subsequent verification of the UAV. Also, computer references depicted as CA1,CA2,CA3 and CA may collectively represent a single computer configured to implement the depicted functions, or alternatively, may represent two or three computers. In addition to the computer or computers depicted (e.g., CA,CA1,CA2,CA3), other numbers of computers, including a network of computers may be provided to carry out the command and control operations. These and other advantages may be provided by the invention. For example, although a TPM chip and fTPM firmware may be used, alternatives that may be implemented or provided by a computing standards organization, such as, for example, Trusted Computing Group, may be implemented to provide secure cryptographic communications or exchanges, such as, for example, integrated security provided in certain chips (e.g., communications chips).

What is claimed is:

1. A system for verification of integrity of an unmanned aerial vehicle which resides in the unmanned aerial vehicle (UAV) and which interfaces with both the communications system of the UAV and the UAV's software resources and hardware resources and which executes firmware which operates independently of any UAV operator conducting a separate integrity check of the UAV or systems of the UAV and, during a flight of the UAV:

a. obtains a serial number or unique identifier of hardware and software on the UAV, and b. creates a hash code combination of the serial number or the unique identifier, and c. encrypts the hash code using an encryption algorithm, and d. transmits the encrypted hash code over a wired or wireless communications system to a computer which maintains a table of certified codes of a plurality of UAVs which results in said computer verifying authenticity of the UAV being verified or not verifying the UAV, and e. where the computer then determines whether the hardware or the software has been changed since the UAV was last certified;

f. wherein the system carries out a hardware and software integrity check during the flight of the UAV and includes a control mechanism for controlling the UAV, g. wherein said control mechanism is controlled using verified integrity communications for UAV operations during the flight of the UAV; wherein the communications comprise authenticated communications for the UAV that control a UAV speed and a direction; and h. wherein said hash code and the encryption algorithm are not known to the UAV owner or operator, wherein the hash code and the encryption algorithm comprise a zero-knowledge proof protocol, wherein the UAV is configured with instructions that provide the protocol for generating the hash code from the hardware and the software on the UAV, where verification of UAV authentication parameters remains unknown to the UAV even where the UAV carries the hardware and the software from which the hash code is generated;

i. wherein the authenticated communications that control the UAV speed and the direction that are issued only when there is verification of the hardware and software integrity check during the flight of the UAV comprise a control of the UAV speed and the direction for entering an airspace zone, and wherein when there is a failure of the verification of the hardware and software integrity check during the flight of the UAV, the authenticated communications that control the UAV speed and the direction do not control the UAV to enter the airspace zone.

2. The system of claim 1, wherein a trusted platform module (TPM) standards compliant chip/system is provided in the UAV for verification of the integrity of the hardware.

3. The system of claim 1, wherein the UAV software includes the firmware or wherein the UAV includes the firmware comprising a firmware trusted platform module (fTPM) system.

4. The system of claim 2, wherein the TPM chip verification is also used to encrypt communications between the UAV and a central command and control system that communicates with the UAV during the flight of the UAV.

5. The system of claim 4, wherein said central command and control system is automated.

6. The system of claim 4, wherein said central command and control system is operated by a human.

7. The system of claim 3, wherein a fTPM (firmware TPM) function resides in an existing computer on the UAV to perform steps a. through d.

8. The system of claim 1, further comprising a public key system or private key system configured to further encrypt the hash code created in step b.

9. The system of claim 8, wherein the public key system or private key system includes a time element and/or a location element either of which may be used to further encrypt the hash code.

10. A method for securing an unmanned aerial vehicle (UAV) operation including during a flight of the UAV where said UAV includes a plurality of hardware components and where said UAV includes software, the method comprising, during the flight of the UAV:

generating an authentication hash code corresponding to at least one UAV, and storing said authentication hash code;

providing at least one computing component electronically coupled with one or more of said plurality of hardware components or said software of said at least one UAV;

obtaining a unique identifier of at least one: (i) hardware component of said plurality of hardware components, or (ii) said software;

creating from said unique identifier a verification hash code for said at least one hardware component or said software;

encrypting said verification hash code using an encryption algorithm;

transmitting said encrypted verification hash code over a communications network to a remotely situated computing component, decrypting said encrypted verification hash code;

comparing said verification hash code with said stored authentication hash code;

authenticating the UAV when said verification hash code matches said stored authentication hash code;

wherein said securing of the UAV operation includes securing control directives communicated to the UAV during the UAV operation over the communications network from the remotely situated computing component, wherein the control directives comprise authenticated communications for the UAV that control a UAV speed and a direction;

wherein said system carries out said authenticating of the UAV during the flight of the UAV that comprises a hardware and software integrity check, wherein said hash code and the encryption algorithm are not known to the UAV owner or operator, wherein the hash code and the encryption algorithm comprise a zero-knowledge proof protocol, wherein the UAV is configured with instructions that provide the protocol for generating the hash code from the hardware and the software on the UAV, where verification of UAV authentication parameters remains unknown to the UAV even where the UAV carries the hardware and the software from which the hash code is generated; and wherein the authenticated communications that control the UAV speed and the direction that are issued only when there is verification of the hardware and software integrity check during the flight of the UAV comprise a control of the UAV speed and the direction for entering an airspace zone, and wherein when there is a failure of the verification of the hardware and software integrity check during the flight of the UAV, the authenticated communications that control the UAV speed and the direction do not control the UAV to enter the airspace zone.

11. The method of claim 10, wherein said stored authentication hash code is stored in a database.

12. The method of claim 11, further comprising providing a database having a stored plurality of authentication hash codes, wherein each of said stored plurality of authentication hash codes corresponds with a specific UAV.

13. The method of claim 10, further comprising determining whether one of said hardware components or said software of said UAV has been changed.

14. The method of claim 10, further comprising certifying said UAV by generating said authentication hash code corresponding to said UAV, and storing said authentication hash code.

15. The method of claim 14, wherein said remotely situated computing component maintains a table of the certified codes of a plurality of UAVs, wherein said remotely situated computing component is configured with verification software containing instructions to generate said verification hash code, compare said generated verification hash code with the certified codes in said table, and authenticating said UAV when said authentication hash code matches said verification hash code.

16. The method of claim 14, wherein said remotely situated computing component maintains a table of the certified codes of a plurality of UAVs, wherein said remotely situated computing component is configured with verification software containing instructions to generate said verification hash code, compare said generated verification hash code with the certified codes in said table, and determine whether one of said hardware components or said software of the UAV has been changed since the UAV was last certified.

17. The method of claim 10, wherein said unique identifier comprises a serial number.

18. The method of claim 10, wherein obtaining a unique identifier is done for at least one of the plurality of hardware components, and for said software; and wherein said verification hash code is created from a combination of said at least one hardware unique identifier obtained for the at least one of the plurality of hardware components, and said unique identifier obtained for said software.

19. The method of claim 18, wherein said remotely situated computing component maintains a table of the certified codes of a plurality of UAVs, wherein said remotely situated computing component is configured with verification software containing instructions to generate said verification hash code, compare said generated verification hash code with the certified codes in said table, and authenticating said UAV when said authentication hash code matches said verification hash code.

20. The method of claim 19, comprising operating said UAV when said UAV has been authenticated by said verification hash code.

21. The method of claim 10, wherein transmitting said encrypted verification hash code is done over a wireless communications network.

22. The method of claim 10, wherein transmitting said encrypted verification hash code is done over a wired communications network.

23. The method of claim 10, wherein said wherein a trusted platform module (TPM) standards compliant chip/system is provided in the UAV for: generating the authentication hash code, obtaining a unique identifier of at least one: (i) hardware component of said plurality of hardware components, or (ii) said software; and creating from said unique identifier a verification hash code for said at least one hardware component or said software.

24. The method of claim 23, wherein the UAV software includes the firmware or wherein the UAV includes the firmware comprising a firmware trusted platform module (fTPM) system.

25. The method of claim 23, wherein the TPM standards compliant chip/system encrypts communications between the UAV and the remotely situated computing component.

26. The method of claim 10, wherein said remotely situated computing component comprises a central command and control system.

27. The method of claim 10, wherein a fTPM (firmware TPM) function resides in said at least one computing component electronically coupled with one or more of said plurality of hardware components or said software of said UAV for generating the authentication hash code, obtaining a unique identifier of at least one: (i) hardware component of said plurality of hardware components, or (ii) said software; and creating from said unique identifier a verification hash code for said at least one hardware component or said software.

28. The method of claim 10, wherein encrypting said verification hash code comprises includes implementing a public key system or private key system.

29. The method of claim 28, wherein the public key system or private key system includes a time element and/or a location element either of which may be used to further encrypt the hash code.

30. An unmanned aerial vehicle (UAV) comprising:

a plurality of hardware components, including at least one processing component, at least one storage component, at least one rotor and an associated drive component connected to the rotor to drive the rotor;

software being stored on said storage component;

a power supply;

a control mechanism for controlling a speed and a direction of the UAV;

communications hardware for receiving and transmitting communications;

a system interfacing with said communications hardware of the UAV, said software, and at least one of said plurality of hardware components;

wherein said UAV executes the software during a flight of the UAV that:

generates an authentication hash code corresponding to said UAV;

obtains a unique identifier of at least one: (i) hardware component of said plurality of hardware components, or (ii) said software;

creates from said unique identifier a verification hash code for said at least one hardware component or said software;

encrypts said verification hash code using an encryption algorithm; and transmits said encrypted verification hash code via said communications hardware over a communications network to a remotely situated computing component;

wherein the control mechanism for controlling the speed and the direction of the UAV controls the speed and the direction of the UAV while the UAV is in flight, and wherein the communications hardware for receiving and transmitting communications receives communications for controlling the speed and the direction of the UAV during the flight of the UAV, and wherein during the flight of the UAV the UAV speed and the direction are controlled by authenticated communications to prevent takeover of the UAV;

wherein during the flight of the UAV said system carries out a hardware and software integrity check during the flight of the UAV using the verification hash code, and wherein said verification hash code and the encryption algorithm are not known to the UAV owner or operator;

wherein the authenticated communications that control the UAV speed and the direction are issued only when there is verification of the hardware and software integrity check during the flight of the UAV;

wherein when the integrity check of the hardware and software during the flight fails verification during the flight of the UAV, the UAV lands at a designated location or reverts to manual control to control the UAV; and wherein the authenticated communications that control the UAV speed and the direction that are issued only when there is verification of the hardware and software integrity check during the flight of the UAV comprise a control of the UAV speed and the direction for entering an airspace zone, and wherein when there is a failure of the verification of the hardware and software integrity check during the flight of the UAV, the authenticated communications that control the UAV speed and the direction do not control the UAV to enter the airspace zone.

31. The unmanned aerial vehicle of claim 30, wherein said UAV is configured to communicate via said communication hardware with a remote computing component which has access to said authentication hash code and which is configured to decrypt said encrypted verification hash code, to compare said verification hash code with said stored authentication hash code, and to verify the authenticity of the UAV when said verification hash code matches a stored authentication hash code of the UAV.

32. The unmanned aerial vehicle of claim 31, wherein said UAV, upon being verified, is configured to receive an operation code.

33. The unmanned aerial vehicle of claim 31, wherein said UAV is configured to execute the software comprising instructions provided as part of a trusted platform module (TPM) standards compliant chip/system.

34. The unmanned aerial vehicle of claim 33, wherein a fTPM (firmware TPM) function resides in at least one of said plurality of hardware components, and wherein said fTPM includes instructions for:

generating an authentication hash code corresponding to said UAV;

obtaining a unique identifier of at least one: (i) hardware component of said plurality of hardware components, or (ii) said software;

creating from said unique identifier a verification hash code for said at least one hardware component or said software; and encrypting said verification hash code.

35. The unmanned aerial vehicle of claim 34, wherein said fTPM includes instructions for:

transmitting said encrypted verification hash code via said communications hardware over a communications network to the remotely situated computing component.

36. The system of claim 1, wherein the control mechanism for controlling the UAV receives a verified instruction via verified integrity communications in order for the UAV to undertake at least one or more of the following: undertake a particular flight plan or path, or carry out an operation that includes deployment of a payload.

37. The system of claim 1, wherein the UAV control mechanism makes a request for verification in order to undertake at least one or more of the following: enter a controlled airspace, undertake a particular flight plan or path, or carry out an operation that includes deployment of a payload.

38. The system of claim 1, wherein the certification is carried out by a certification authority, and wherein said hash code and the encryption algorithm is known to the certification authority.

39. The system of claim 38, wherein said verification is carried out while the UAV is in flight and prior to a UAV in-flight operation.

40. The system of claim 38, wherein said verification is carried out prior to the UAV carrying out one or more of the following: entering a location, operating onboard equipment or delivering a payload.

* * * * *